United States Patent [19]

Hliboki et al.

[11] 4,240,743
[45] Dec. 23, 1980

[54] VACUUM FRAME

[75] Inventors: Joseph G. Hliboki, Old Tappan; Paul Staudenmaier, Flanders, both of N.J.

[73] Assignee: Teaneck Graphics Corp., Carlstadt, N.J.

[21] Appl. No.: 904,114

[22] Filed: May 8, 1978

[51] Int. Cl.² ............................ G03B 27/60; G03B 27/20
[52] U.S. Cl. ............................................ 355/73; 355/93
[58] Field of Search ................... 355/73, 76, 91, 93, 355/94

[56] References Cited

U.S. PATENT DOCUMENTS

| | | | |
|---|---|---|---|
| 2,117,051 | 5/1938 | Anderson | 355/93 |
| 2,826,976 | 3/1958 | Gelb | 355/93 |
| 3,357,335 | 12/1967 | Blatherwick | 355/93 |
| 3,359,879 | 12/1967 | Hamlin | 355/93 |
| 3,420,608 | 1/1969 | Canale | 355/91 |
| 3,644,039 | 2/1972 | Boyer | 355/73 X |
| 3,995,955 | 12/1976 | Töpfer | 355/76 X |

*Primary Examiner*—Donald A. Griffin
*Attorney, Agent, or Firm*—David A. Jackson

[57] ABSTRACT

A vacuum frame, comprising a base section, a cover hingeably attached to the base section and including a transparent section, the cover and base section forming a vacuum chamber therebetween when the vacuum frame is in a closed position, a reserve vacuum tank in fluid communication with the vacuum chamber, the vacuum tank adapted to create a vacuum within the vacuum chamber, a vacuum pump in fluid communication with the reserve vacuum tank, the vacuum pump adapted to create a vacuum within the reserve vacuum tank, and an electro-mechanical means for simultaneously regulating the vacuum pressure within the vacuum chamber and reserve vacuum tank and the actuation of the vacuum pump.

11 Claims, 6 Drawing Figures

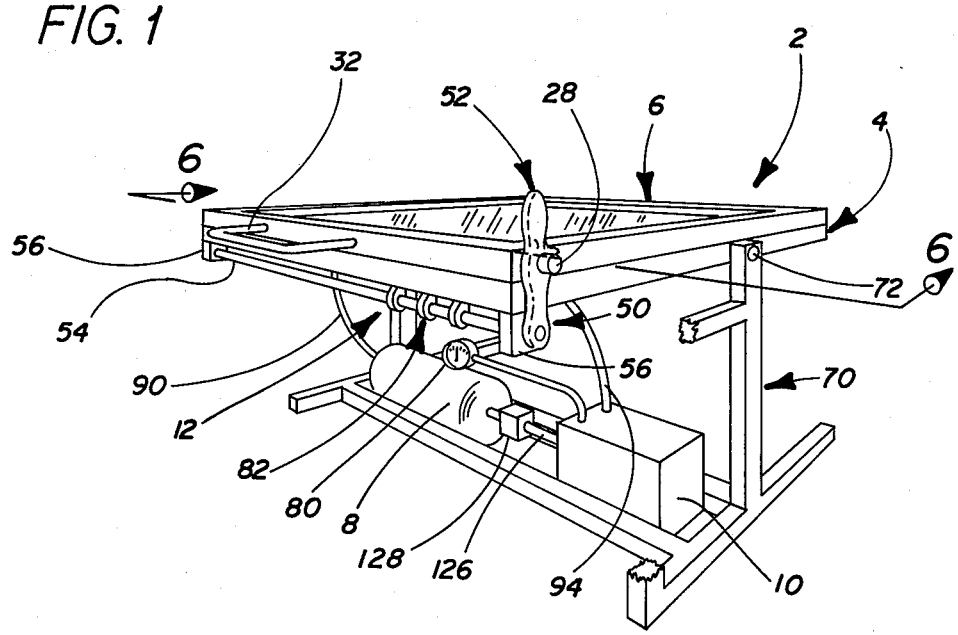
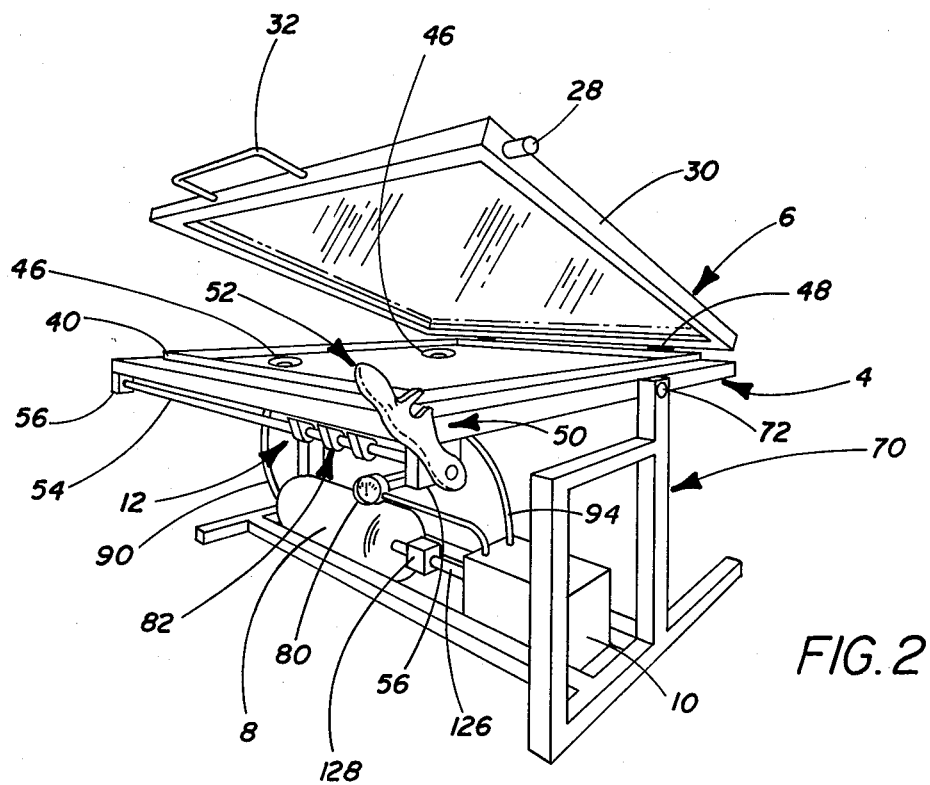

VACUUM FRAME

BACKGROUND OF THE INVENTION

This invention relates to a vacuum frame. More particularly, this invention relates to a vacuum printing frame for reproduction purposes.

It is well known in the art to provide a vacuum frame for reproducing an original document or work of art utilizing a sensitized material. However, most of the prior art vacuum frames include a vacuum pump in direct communication with the vacuum chamber of the vacuum frame, in which the pump must be manually actuated each time the vacuum frame is used. It can be seen that the utilization of such a prior art device results in an inefficiency and time consumption which are undesirable in this field.

Still other prior art devices utilize an automatic means in which a vacuum pump is automatically activated by a switching arrangement upon a manual closing of the glass cover upon the base portion. However, these apparatuses utilize switching arrangements that are complex and expensive. Moreover, each time the apparatus is utilized, the vacuum pump must be activated in order to create a vacuum within the vacuum chamber of the frame. An example of such an apparatus can be seen in U.S. Pat. No. 3,357,335.

Other prior art devices utilize a vacuum pump and a vacuum tank to create a vacuum between two parallel spaced plates. For example, U.S. Pat. No. 3,759,613 discloses a photoplotter cassette in which a vacuum tank is disposed between the vacuum chamber of the two parallel spaced plates and a vacuum pump. Disposed between the vacuum tank and the vacuum chamber is a valve. In this manner, when the valve is manually closed, the vacuum pump creates a vacuum within the vacuum tank and when the valve is open the vacuum tank creates a vacuum within the vacuum chamber. However, in utilizing this apparatus each step must be done manually and there is no disclosure utilizing the vacuum in the tank to create a vacuum within the vacuum chamber over numerous operations.

The present apparatus is believed to solve these aforementioned problems in the art.

SUMMARY OF THE INVENTION

In accordance with the present invention, a vacuum frame is provided, comprising a base section, a cover hingably attached to the base section and including a transparent section, the cover and base section forming a vacuum chamber therebetween when the vacuum frame is in a closed position, a reserve vacuum tank in fluid communication with the vacuum chamber, the vacuum tank adapted to create a vacuum within the vacuum chamber, a vacuum pump in fluid communication with the reserve vacuum tank, the vacuum pump adapted to create a vacuum within the reserve vacuum tank, and an electro-mechanical means for simultaneously regulating the vacuum pressure within the vacuum chamber and reserve vacuum tank and the actuation of the vacuum pump.

Accordingly, it is a principal object of the present invention to provide a vacuum frame which automatically creates a vacuum within a vacuum frame upon closing the frame by means of a vacuum pump, a reserve vacuum tank and an automatic valve and switching system.

It is a further object of the present invention to provide a vacuum frame which automatically provides a vacuum within the frame upon closing of the frame by means of a reserve vacuum tank, wherein a vacuum created in the reserve vacuum tank may be utilized over numerous operations.

It is a still further object of the present invention to provide a vacuum frame which automatically creates a vacuum in the vacuum frame upon closing of the frame by means of a reserve vacuum tank and a vacuum pump, wherein the vacuum pump is adapted to create a vacuum within the reserve vacuum tank upon a decrease in vacuum pressure within the reserve vacuum tank below a preset amount.

It is a yet further object of the present invention to provide a vacuum frame in which a cam means automatically activates the reserve vacuum tank and the vacuum pump upon the closing and locking of the cover to the base section.

It is another object of the present invention to provide a vacuum frame in which a cam means and a valve and switching means operate to disconnect the reserve vacuum tank and vacuum pump from the system and open a bleeder valve to the vacuum chamber upon unlocking of the cover with respect to the base section.

It is still another object of the present invention to provide a vacuum frame which is simple but novel and inexpensive to manufacture.

Further objects and advantages will become apparent to those skilled in the art from the ensuing description which proceeds with reference to the accompanying figures.

BRIEF DESCRIPTION OF THE DRAWINGS

FIG. 1 is a perspective view of the vacuum frame of the present invention in its closed position.

FIG. 2 is a perspective view of the vacuum frame of the present invention in its opened position.

DESCRIPTION OF THE PREFERRED EMBODIMENT

Figure 4:
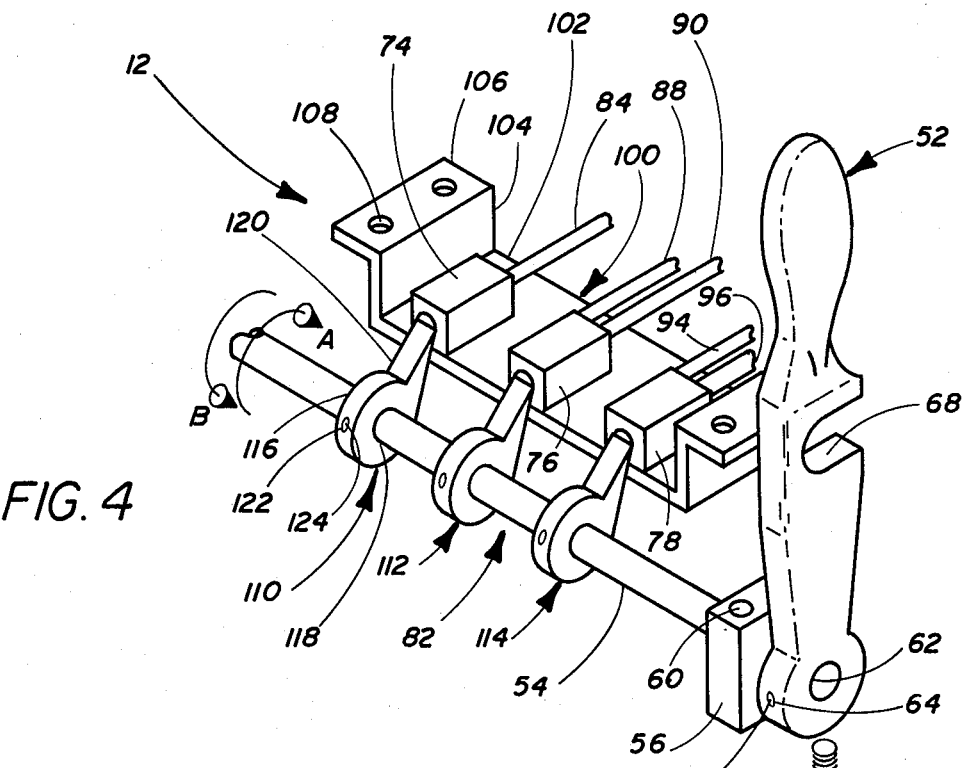
FIG. 4 is an enlarged, perspective view of the cam means and valve and switch means of FIG. 1.

Referring to the drawings in detail wherein like numerals indicate like parts, and initially to FIG. 1, the vacuum frame 2 in accordance with the present invention is illustrated comprising a base section 4, a cover 6 hingably attached to base section 4, a reserve vacuum tank 8, a vacuum pump 10, and a valve and switching means 12.

Figure 6:
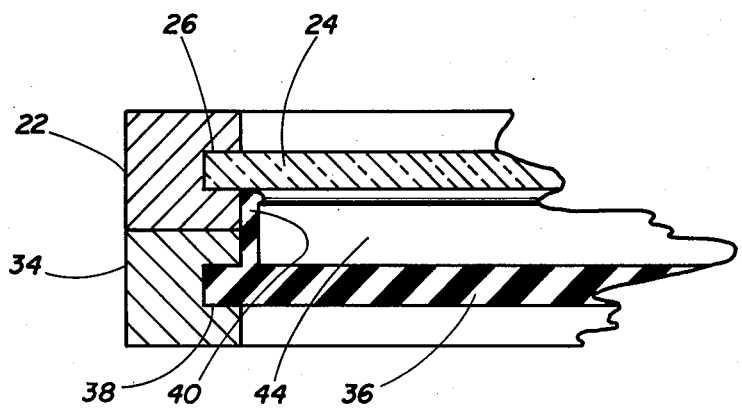
FIG. 6 is a partial, cross-sectional view taken along line 6—6 of FIG. 1.

Referring to FIGS. 1, 2 and 6, cover 6 comprises a generally rectangular frame 22, preferably of a metallic material, and a transparent plate 24 disposed within frame 22 and parallel thereto, transparent plate 24 being attached by any suitable means to frame 22, e.g., transparent plate 24 can fit into a slot 26 in frame 22, the slot 26 traversing the inner periphery of frame 22. Transparent plate 24 is attached to frame 22 in an air-tight relationship, such that no air may pass through the seal created by transparent plate 24 and frame 22. Transparent plate 24 is made preferably of a glass or durable plastic material. Cover 6 also comprises locking pin 28 of a cylindrical configuration, locking pin 28 extending from an outer peripheral side section 30 of frame 22, to be later discussed. Attached to an outer peripheral front section of frame 22 is handle 32 for opening and closing cover 6 with respect to base section 4.

Referring to FIGS. 1, 2 and 6, base section 4 includes a frame section 34 of a rectangular configuration, frame section 34 preferably being of a metallic material. Disposed within the inner periphery of frame section 34 and parallel thereto, is blanket 36, preferably of a rubber material. Blanket 36 is attached to frame 34 by any suitable means, e.g., blanket 36 can be inserted within inner peripheral slot 38 of frame 34, as described previously with respect to transparent plate 24 and cover slot 26, as shown in FIG. 6. Frame 34 is of the same dimensions as frame 22. In this manner, when vacuum frame 2 is in a closed position, as shown in FIGS. 1 and 6, cover frame 22 corresponds to and abuts base frame section 34. Base section 4 also includes a gasket 40, as shown in FIG. 6, gasket 40 preferably being of a rubber, resilient material. Gasket 40 is attached to the periphery of blanket 36 at the juncture of blanket 36 and base frame section 34 and abuts the inner periphery of base frame section 34 and extends therebeyond in such a manner that when vacuum frame 2 is in a closed position, the upper end 42 of gasket 40 abuts transparent plate 24 to create an air-tight vacuum chamber 44 between transparent plate 24 and blanket 36. In addition, blanket 36 of base section 4 also comprises at least two apertures 46 therein as shown in FIG. 2, to be later discussed. Cover 6 and base section 4 are hingably attached to each other at the outer peripheral rear sections thereof by hinges 48, as shown in FIG. 2.

As shown in FIGS. 1, 2 and 4, a vacuum frame locking means 50 is provided comprising a handle 52 fixedly secured to a rotatable shaft 54, shaft 54 being rotatably mounted within a pair of end brackets 56. End brackets 56 are mounted to base section 4 by any suitable means such as bolts 58 through bores 60 within end brackets 56, as shown in FIG. 4. Handle 52 may be secured to shaft 54 by any suitable means, e.g., handle 52 may include an aperture 62 at one end thereof of the same diameter as shaft 54 and a screw threaded aperture 64 at the same end as aperture 62 and at an edge of handle 52, through which a set screw 66 may be screw-threadedly received to fixedly secure handle 52 to shaft 54. Handle 52 also includes an arcuate cut-out section 68 of the same dimension as cylindrical locking pin 28 such that when handle 52 and shaft 54 are rotated, arcuate cut-out section 68 mates with cylindrical locking pin 28 to releasably secure cover 6 and base section 4 together. In addition, a second handle 52 and locking pin 28 may be provided on the opposite side of vacuum frame 2 to insure that cover 6 and base section 4 are locked together.

Referring to FIGS. 1 and 2, base section 4 is hingably attached to supporting frame 70 by any suitable means such as pivot pins 72. Supporting frame 70 is of such a height that base section 4 and cover 6, if allowed, could freely rotate about pivot pins 72 in a circular rotation. In addition, a stopping mechanism (not shown) may be utilized in conjunction with supporting frame 70 and pivot pins 72 to limit the rotational travel of base section 4 and cover 6 about pivot pins 72.

Figure 3:
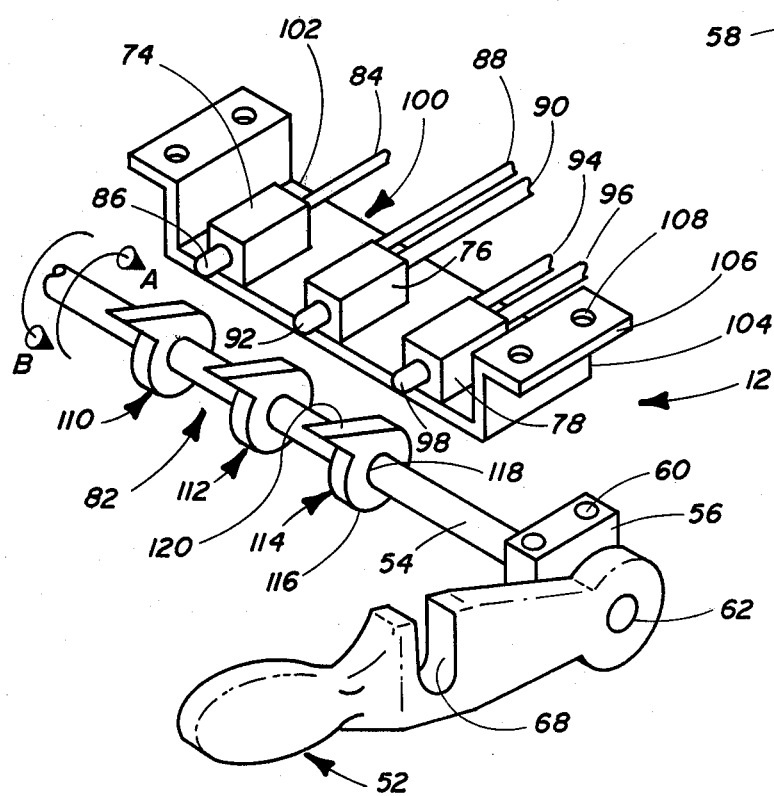
FIG. 3 is an enlarged, perspective view of the cam means and valve and switch means of FIG. 2.

Referring to FIGS. 3 and 4, the valve and switching means 12 of the present invention comprises a bleeder valve 74, a reserve vacuum tank valve 76, a vacuum pump switch 78, a reserve vacuum tank switch 80 and a cam means 82. Bleeder valve 74 is in fluid communication with one aperture 46 of base section 4 by means of bleeder line 84. Bleeder valve 74 may include any conventional bleeder valve assembly having an outwardly biased bleeder valve shaft 86.

Figure 5:
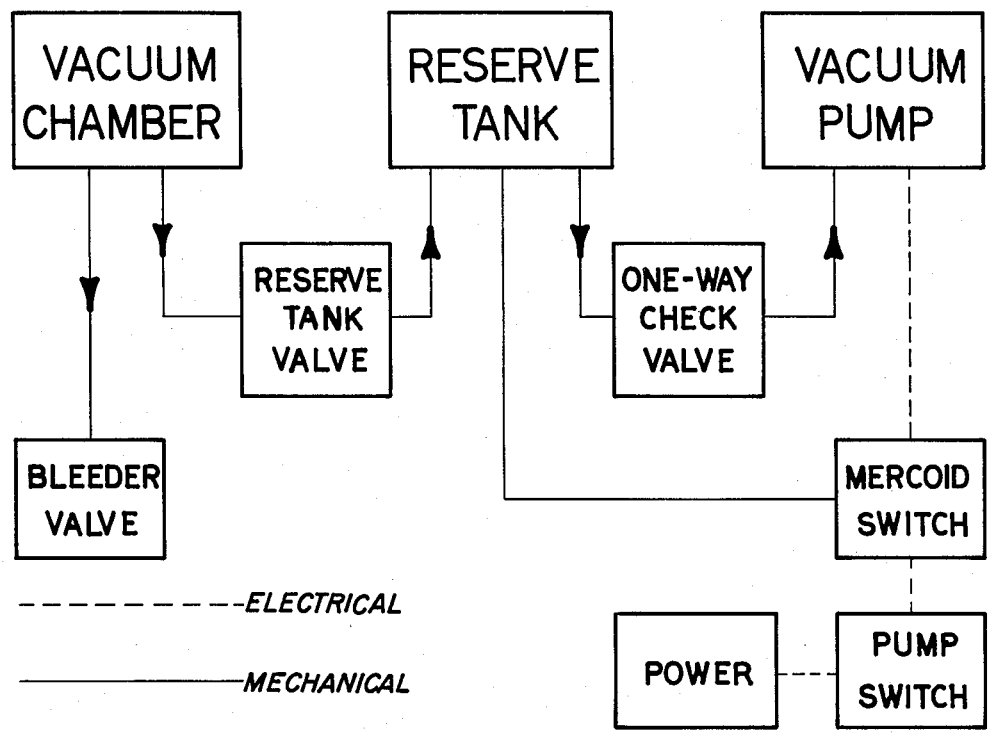
FIG. 5 is a schematic view of the vacuum frame of the present invention.

Referring to FIGS. 3, 4 and 5, reserve vacuum tank valve 76 is in fluid communication with a second aperture 46 of vacuum chamber 44 by means of vacuum chamber line 88, and in fluid communication with reserve vacuum tank 8 by means of reserve vacuum tank line 90. Reserve vacuum tank valve 76 may include any suitable one-way valve means, permitting fluid to pass in only one direction from vacuum chamber 44 to reserve vacuum tank 8, having an outwardly biased reserve vacuum tank valve shaft 92 such that when shaft 92 is depressed, reserve vacuum tank 8 and vacuum chamber 44 are in fluid communication and when shaft 92 is outwardly biased, reserve vacuum tank 8 is taken out of fluid communication with vacuum chamber 44.

Vacuum pump switch 78 is electrically connected to vacuum pump 10 by means of electric pump line 94 and is in electrical communication with a power source by means of electric power line 96, as shown in FIGS. 3, 4 and 5. Vacuum pump switch 78 may include any suitable switch means having an outwardly biased pump switch shaft 98 such that when shaft 98 is depressed, the power source is in electrical communication with vacuum pump 10 and when shaft 98 is outwardly biased, the circuit between the power source and vacuum pump 10 is open.

Referring to FIGS. 3 and 4, bleeder valve 74, reserve vacuum tank valve 76 and vacuum pump switch 78 are attached to base section 4 by support section 100, comprising a flat base portion 102, flange sections 104, and outwardly extending flange sections 106 having bolt apertures 108 therein through which support structure 100 may be secured to base section 4. Bleeder valve 74, reserve vacuum tank valve 76 and vacuum pump switch 78 are secured to base portion 102 of support structure 100 in any suitable manner.

Referring to FIGS. 3 and 4, cam means 82 comprises bleeder valve cam 110, reserve vacuum tank valve cam 112 and pump switch cam 114. Each cam comprises a circular main section 116 having a central aperture 118 therein, central aperture 118 having the same dimension as rotatable shaft 54. Each cam also comprises an upstanding wedge shaped section 120 attached to circular main section 116. Circular main section 116 also comprises a screw threaded bore 122 connecting the inner and outer peripheral sections of circular main section 116 through which a set screw 124 is screw-threadedly received. Each cam is received on rotatable shaft 54 through central aperture 118 and is fixedly retained thereon by set screw 124. Referring to FIGS. 3 and 4, bleeder valve cam 110 is aligned with bleeder valve 74 such that when rotatable shaft 54 is rotated in the direction of arrow A, upstanding wedge-shaped section 120 of cam 110 depresses shaft 86 of bleeder valve 74 and when shaft 54 is rotated in the direction of arrow B, cam 110 does not contact shaft 86 of bleeder valve 74. In like manner, cam 112 is aligned with reserve vacuum tank valve 76 and cam 114 is aligned with vacuum pump switch 78. In addition, cams 110, 112 and 114 are aligned on shaft 54 so as to simultaneously depress and release the respective aligned shafts 86, 92 and 98 upon the rotation of shaft 54 in the direction of arrows A and B.

Referring to FIGS. 1, 2 and 5, reserve vacuum tank 8 is in fluid communication with vacuum pump 10 by means of connection line 126. Disposed within connection line 126 is one-way check valve 128 which may be any suitable valve means that permits the fluid to pass in only one direction from reserve vacuum tank 8 to vacuum pump 10.

In fluid communication with reserve vacuum tank 8 and in electric communication with vacuum pump 10 is reserve vacuum tank switch 80 which may comprise any suitable switch means such as a mercoid switch. Mercoid switch 80 includes a high and low vacuum pressure setting such that when the vacuum pressure within reserve vacuum tank 8 falls below the lower setting or limit, mercoid switch 80 closes the electrical circuit between the power source and vacuum pump 10 and when the vacuum pressure within reserve vacuum tank 8 reaches a certain upper limit, mercoid switch 80 interrupts or opens the circuit between the power source and the vacuum pump 10. Practical limits that have been utilized are a lower limit of 22 p.s.i. and an upper limit of 26 p.s.i. In addition, as shown in FIG. 5, mercoid switch 80 acts to override pump switch 78 during the operation of vacuum frame 2, to be later discussed.

In operation, base section 4 and cover 6 are open with respect to each other and base section 4 is locked at a horizontal position with respect to the ground. A sensitized material, such as sensitive paper or an offset plate, is placed on rubber blanket 36 and a film negative is placed on the sensitized material and in alignment therewith. Vacuum frame 2 is then placed in a closed position such that cover 6 abuts base section 4 and a vacuum chamber 44 is formed by transparent plate 24, blanket 36 and gasket 40. Handle 52 is then rotated such that arcuate cut-out section 68 of handle 52 mates with locking pin 28 of cover 6, as shown in FIG. 1. As handle 52 is rotated in the direction of arrow A in FIG. 4, cams 110, 112 and 114 simultaneously depress shafts 86, 92 and 98, respectively, causing bleeder valve 74 to close, reserve vacuum tank valve 76 to open and vacuum pump switch 78 to close the circuit between the power supply and vacuum pump 10. In this manner, vacuum chamber 44, reserve tank 8 and vacuum pump 10 form a closed system, in which vacuum pump 10 creates a vacuum within reserve tank 8 and vacuum chamber 44. When the vacuum pressure within reserve vacuum tank 8 reaches an upper limit set by mercoid switch 80, e.g., 26 p.s.i., mercoid switch 80 opens the circuit between the power supply and vacuum pump 10 so as to override pump switch 78. Thus, it can be seen that when vacuum pump 10 is removed from the system by mercoid switch 80, reserve tank 8 and vacuum chamber 44 form a closed system at equal vacuum pressure. Because of the vacuum created within vacuum chamber 44, the sensitized material and the film negative are forced into a flat and abutting relationship against transparent plate 24 of cover 6. With cover 6 and base section 4 still retained in a locked position by handle 52, base section 4 is rotated about pivot pins 72 to a perpendicular position with respect to the ground and a bright light is focused on the sensitized material and film negative so as to develop the sensitized material in an exact copy of the film negative.

After the copy is made and base section 4 is returned to a parallel or horizontal position with respect to the ground, handle 52 is rotated in the direction of arrow B, as shown in FIG. 3, wherein shafts 86, 92 and 98 are freed from restraint and simultaneously biased outwardly. In this manner, bleeder valve 74 opens the communication between vacuum chamber 44 and the outside air, thereby releasing the vacuum within vacuum chamber 44. Reserve vacuum tank valve 76 simultaneously closes the communication between reserve vacuum tank 8 and vacuum chamber 44, thus retaining the vacuum within reserve vacuum tank 8. Vacuum pump switch 78 opens the circuit between the power supply and vacuum pump 10. It can thus be seen that a vacuum is retained within reserve vacuum tank 8 while the vacuum in vacuum chamber 44 is released in order to allow cover 6 to be hingably opened with respect to base section 4, wherein the film negative and sensitized material are removed.

A second sensitized material and film negative are then placed within vacuum frame 2, as previously mentioned. Upon the rotating of handle 52 in the direction of arrow A, as shown in FIG. 4, and upon the simultaneous depression of outwardly biased shafts 86, 92 and 98, bleeder valve 74 is closed, reserve vacuum tank valve 76 is opened and vacuum pump switch 78 closes the circuit between the power supply and vacuum pump 10. However, since the vacuum pressure within reserve vacuum tank 8 has not fallen below the lower limit as set by the mercoid switch, e.g., 22 p.s.i., mercoid switch 80 overrides pump switch 78 and opens the circuit between the power supply and vacuum pump 10. The vacuum retained within reserve vacuum tank 8 then causes vacuum chamber 44 to be evacuated, wherein the sensitized material may be developed. Upon the rotation of handle 52 in the direction of arrow B, as shown in FIG. 3, reserve vacuum tank valve 76 is closed, bleeder valve 74 is opened and pump switch 78 opens the circuit between the power supply and vacuum pump 10. In this manner, it can be seen that the vacuum created within reserve vacuum tank 8 and retained therein, can be utilized over successive operations of copying.

It is to be understood that the invention is not limited to the illustration described and shown herein, which are deemed to be merely illustrative of the best modes of carrying out the invention, and which are suitable of modification of form, size, arrangement of parts, and details of operation. The invention rather is intended to encompass all such modifications which are within the spirit and scope as defined by the claims.

What is claimed is:

1. A vacuum frame, comprising:
   a base section;
   a cover hingably attached to said base section and including a transparent section, said cover and said base section forming a vacuum chamber therebetween when said vacuum frame is in a closed position;
   a reserve vacuum tank in fluid communication with said vacuum chamber, said reserve vacuum tank adapted to create a vacuum within said vacuum chamber;
   a vacuum pump means in fluid communication with said reserve vacuum tank, said vacuum pump means adapted to create a vacuum within said reserve vacuum tank; and
   an electro-mechanical means for simultaneously regulating the vacuum pressure within said vacuum chamber and said reserve vacuum tank and the actuation of said vacuum pump means, said electro-mechanical means comprising a cam means secured to said vacuum frame for simultaneously actuating a series of valves and switches for regulating a vacuum within said vacuum chamber and said reserve vacuum tank.

2. The vacuum frame of claim 1, wherein said base section comprises a frame section having a blanket disposed therein and parallel thereto, said blanket having at least two apertures therein.

3. The vacuum frame of claim 2, wherein said blanket includes a gasket attached thereto at the inner periphery of said frame section.

4. The vacuum frame of claim 1, wherein said cover includes a frame section and a transparent plate disposed therein and parallel thereto.

5. The vacuum frame of claim 4, wherein said cover includes a locking pin attached to said frame section of said cover.

6. The vacuum frame of claim 1, wherein said electromechanical means comprises a bleeder valve in fluid communication with said vacuum chamber, said bleeder valve adapted to release a vacuum within said vacuum chamber.

7. The vacuum frame of claim 1, wherein said electromechanical means includes a reserve vacuum tank valve in fluid communication with said reserve vacuum tank and said vacuum chamber, said reserve vacuum tank valve adapted to open and close said communication between said reserve vacuum tank and said vacuum chamber.

8. The vacuum frame of claim 1, wherein said electromechanical means comprises a vacuum pump switch in electrical communication with said vacuum pump means, said vacuum pump switch adapted to open and close a circuit between a power supply and said vacuum pump means.

9. The vacuum frame of claim 1, wherein said electromechanical means includes a reserve vacuum tank switch in fluid communication with said reserve vacuum tank and in electrical communication with said vacuum pump means, said reserve vacuum tank switch being adapted to open a circuit between a power supply and said vacuum pump means when the vacuum pressure within said reserve vacuum tank has reached a predetermined upper limit, and to close said circuit between said power supply and said vacuum pump means when vacuum pressure within said reserve vacuum tank has reached a predetermined lower limit.

10. The vacuum frame of claim 1, comprising a handle for locking said cover to said base section.

11. A vacuum frame, comprising:
a base section;
a cover hingably attached to said base section and including a transparent section, said cover and said base section forming a vacuum chamber therebetween when said vacuum frame is in a closed position;
a reserve vacuum tank in fluid communication with said vacuum chamber, said reserve vacuum tank adapted to create a vacuum within said vacuum chamber;
a vacuum pump means in fluid communication with said reserve vacuum tank, said vacuum pump means adapted to create a vacuum within said reserve vacuum tank;
a bleeder valve in fluid communication with said vacuum chamber, said bleeder valve adapted to release a vacuum within said vacuum chamber;
a reserve vacuum tank valve in fluid communication with said reserve vacuum tank and said vacuum chamber, said reserve vacuum tank valve adapted to open and close said communication between said reserve vacuum tank and said vacuum chamber;
a vacuum pump switch in electrical communication with said vacuum pump means, said vacuum pump switch adapted to open and close a circuit between a power supply and said vacuum pump means;
a reserve vacuum tank switch means in fluid communication with said reserve vacuum tank and in electrical communication with said vacuum pump means, said reserve vacuum tank switch adapted to open a circuit between a power supply and said vacuum pump means when vacuum pressure within said vacuum reserve tank reaches a predetermined upper limit and to close said circuit when said vacuum pressure within said reserve vacuum tank reaches a predetermined lower limit; and
a cam means rotatably secured to said vacuum frame for simultaneously actuating said reserve vacuum tank valve, said bleeder valve and said vacuum pump switch, wherein said vacuum pump switch, said reserve vacuum tank valve, said bleeder valve, said reserve vacuum tank switch and said cam means act to simultaneously regulate said vacuum pressure within said vacuum chamber and said reserve vacuum tank and the actuation of said vacuum pump means.

* * * * *